United States Patent [19]

Bronshtein

[11] Patent Number: 4,720,295

[45] Date of Patent: Jan. 19, 1988

[54] CONTROLLED PROCESS FOR MAKING A CHEMICALLY HOMOGENEOUS MELT FOR PRODUCING MINERAL WOOL INSULATION

[76] Inventor: Boris Bronshtein, 6702 N. Newgard, Chicago, Ill. 60626

[21] Appl. No.: 921,156

[22] Filed: Oct. 20, 1986

[51] Int. Cl.$^4$ .................... C03B 5/16; C03C 13/06
[52] U.S. Cl. .................................. 65/2; 65/19; 65/27; 65/134; 501/27; 501/28; 501/29; 501/36; 501/73; 501/155
[58] Field of Search ............... 65/2, 19, 27, 134; 501/27, 28, 29, 36, 73, 70, 155

[56] References Cited

U.S. PATENT DOCUMENTS

| | | | |
|---|---|---|---|
| 2,976,162 | 3/1961 | Ekdahl | 501/27 |
| 3,150,991 | 9/1964 | Monks | 65/19 X |
| 3,215,542 | 11/1965 | Tinker | 65/19 X |
| 4,236,929 | 12/1980 | Byers et al. | 65/27 X |
| 4,617,045 | 10/1986 | Bronshtein | 65/134 |

Primary Examiner—Robert L. Lindsay
Attorney, Agent, or Firm—Allegretti, Newitt, Witcoff & McAndrews, Ltd.

[57] ABSTRACT

A process for making a homogeneous melt for producing mineral wool insulation. This insulating material is made from waste products namely, bottom ash, cement kiln dust, slag, and waste from mineral wool production. These materials, along with a binder, are homogenized into a mixture. Thereafter, the process includes briquetting the mixture into agglomerated pieces. The agglomerates are then melted in a cupola furnace and the molten agglomerate is discharged into a receiver. Hot combustion gases are then passed into the melt or molten agglomerate to chemically homogenize the melt and heat the melt to preselected temperature. Thereafter, the melt is converted into fibers using conventional practices.

6 Claims, No Drawings

CONTROLLED PROCESS FOR MAKING A CHEMICALLY HOMOGENEOUS MELT FOR PRODUCING MINERAL WOOL INSULATION

This invention relates to a method of manufacturing an agglomerate from locally-available waste materials for the production of mineral wool insulation. The agglomerate is a prefabricated concrete comprising hard and durable pieces which can be readily charged into the cupola furnace and melted. It also relates to the production of mineral wool which is white in color and especially useful in making acoustical tile.

In accordance with conventional practice, the inorganic materials are charged into the cupola with layers of coke, melted at high temperatures, and then fiberized into mineral wool. Mineral wool generally consists of silica, alumina, CaO, MgO, iron oxides, and other metal oxides. A major raw material is blast furnace slag in the form of pieces 1½ inches to 3 inches in size. However, recent tendencies in the steel industry to decrease acidity of slag requires that the compositions be adjusted to control the acid/base ratio. In some geographical areas, blast furnace slag is not readily available, and environmental protection requirements have curtailed the use of slag. It is known that natural volcanic rock, such as diabase, basalt, gabbro, and similar stone are excellent materials for producing rock wool in combination with dolomite or limestone. These igneous rocks have an excellent natural combination of oxides and when charged into a cupola with a small amount of dolomite or limestone, provide the best commercial grades of mineral wool insulation capable of continuous service at temperatures around 1,200° F. However, these igneous rocks are not available locally in many geographical areas.

In the manufacture of mineral wool, there is a considerable amount of production waste due to the fact that only a portion of the total melt is converted into useable fibers. The waste amounts to about 35-40% by weight of the total melt. These pellets, beads, and pieces of glass cannot be charged directly back into the cupola. Obviously, it is a significant commercial advantage to be able to use this waste in the rock wool process. Consequently, attempts have been made to develop a method to manufacture an agglomerated charge suitable for the rock wool operation using the waste material.

According to the prior art, compositions and methods are disclosed for making briquettes for charging into the cupola furnace. British Pat. No. 1,529,288 discloses a process for producing briquettes which do not disintegrate at temperatures above 500° C. and have an initial compressive strength of about 150 kilograms per square centimeter. The compositions disclosed in this patent consist of a binder of Portland cement, ash from ferrosilicon production having at least 75% silica and a particle size of less than 100 microns, and crushed glass wool. During melting, finely-divided $SiO_2$ in the briquettes reacts with the other components and prevents the briquettes from premature disintegration.

U.S. Pat. No. 2,976,162 discloses briquetting granular material using a Mississippi clay and gelatinized corn starch as a binder. The briquettes are prepared in a press or cylindrical mold and have a maximum dimension of about 2 inches. Consolidating pressures range from 4,000-8,000 psi, preferably about 5,000 psi.

The prior art does not disclose any method for manufacturing agglomerate charges for the cupola which are cheap and reliable based upon locally-available waste materials. Nor does the art disclose means for full utilization of the production waste in preparing a homogeneous agglomerate having the mechanical properties required for melting in a cupola furnace. The prior art discloses only physical homogenization of finely-divided constituents but does not disclose chemical homogenization.

In commercial operation melting and holding time in the cupola is technically and economically limited. Therefore, melted glass produced in a cupola is not chemically homogeneous. Furthermore, in the prior art, the melt flowing from the cupola is characterized by significant variation in temperature and flow rate. Since relatively small changes in temperature and the quantity of melt strongly affect fiberization, and finally the quality of the mineral wool, it is important that the temperature and flow rate of melt delivered to fiberization be controlled within narrow limits.

The present invention provides a controlled process for manufacturing a chemically-homogeneous melt for the production of mineral wool insulation of excellent quality and high fiber yield. The process comprises the physical homogenization of raw materials by agglomeration of readily-available, non-hazardous, cheap waste materials, and the chemical homogenization of the melt produced in the cupola furnace. In accordance with the process, the melt temperature and flow rate is stabilized as it is delivered to the fiberization.

The melt from the cupola preferably is discharged into a receiver or overflow container equipped with gas burners in the bottom thereof. High temperature combustion gases emitted from the burners serve to agitate the melt in the receiver, and maintain the melt at constant temperature. The melt in the receiver is characterized by uniform distribution of gases which saturate the melt and provides chemical homogenization of the melt at a temperature of 2,700°-2,800° F. The receiver provides stabilization of temperature and yield of melt delivered to fiberization. Saturated melt from the blast furnace slag and sand having an acid base ratio of $$1.5 - 1.7 \left( ABR = \frac{SiO_2 + Al_2O_3}{CaO + MgO} \right)$$

have been fiberized by a two-wheel spinner into high-quality mineral wool visually similar to fiber glass having an average fiber diameter of about 5 microns.

As indicated, one of the primary objects of the invention is to provide a method for manufacturing mineral wool which utilizes inexpensive ingredients which are normally waste materials and which are readily available in most geographical areas.

Another object is to decrease the amount of waste produced during fiberization through the use of a uniformly sized homogeneous agglomerate.

Another object is to provide a simple and flexible method of producing a mineral wool product characterized by a continuous service temperature in the range of 1,400°-2,000° F. and having a density of 12-20 lb./cu.ft. Such mineral wool insulation is especially suitable for construction as well as for various types of equipment which operate at elevated temperatures. Another object is to provide a method which meets environmental protection requirements and significantly decreases air pollution.

In accordance with the invention, the agglomerate consists essentially of cement kiln dust, bottom ash, and waste from mineral wool production, which is commonly referred to as "shot." The mineral wool production waste, of course, is available from the process itself, while cement kiln dust and bottom ash are waste materials readily available in most geographical areas throughout the United States. The mineral wool production waste consists basically of particles that resemble sand. Larger pieces should be reduced in size and this is readily done because the particles are brittle.

In a modification of the invention for producing wool fibers which are light or white in color, bottom ash and other ingredients which contain more than about 1.0% metal oxides, such as iron oxide and manganese oxide, must be deleted from the agglomerate composition. Also, sulfur should not exceed 1%. Mineral rocks or ceramic waste containing these materials cannot be used for light colored fibers.

Another source of waste which is useful in the present process emanates from cutting scrap created during the sawing of bats and boards prepared by treating the mineral wool fibers with a binder such as a phenolic resin. This scrap can be shredded and reused along with the shot and other production waste. The total waste in a rock wool plant normally comprises 35-40% by weight of the raw materials charged into the cupola. Consequently, the agglomerate compositions of the invention include these quantities. However, it is possible to use up to 60% waste if it is available in sufficient quantities.

In preparing the agglomerate which is used in one form of the present invention, the mineral wool waste is admixed in the amount of about 30-35% by weight with 10-25% of cement kiln dust and 5-30% bottom ash.

A typical cement kiln dust has the following composition:

| | |
|---|---|
| $SiO_2$ | 12-16% |
| $Al_2O_3$ | 3-6% |
| CaO | 41-49% |
| MgO | .7-2.3% |
| $Fe_2O_3$ | 1.1-3.2% |
| $SO_3$ | .2-.7% |
| $Na_2O$ | .2-.7% |
| $K_2O$ | 3.3-4.5% |

The material has a loss on ignition of 15-22%, and a density of 38-50 lb./cu.ft. According to publications of the Bureau of Mines, U.S. Department of Interior, cement kiln dust is not considered to be a hazardous waste.

Bottom ash is a residue produced by combustion of pulverized coal. The ash is standardized according to the content of $SiO_2 + Al_2O_3 + Fe_2O_3$ present, which depends upon the particular type of coal being burned. Ash containing over 50% of these three ingredients is designated as Class "C" and over 70% is Class "F". Bottom ash is usually obtainable from a local source at low cost from power plants in a sand-like form. It consists basically of silica, alumina, and ferric oxides. It is present in the agglomerate of the invention in the amount of 5-30%, preferably 15-20%. A typical chemical composition for Class "F" bottom ash is as follows:

| | |
|---|---|
| $SiO_2$ | 47.3% |
| $Al_2O_3$ | 21.9% |
| CaO | 3.2% |
| MgO | 1.1% |
| $Fe_2O_3$ | 14.5% |
| $Na_2O$ | 1.9% |
| $K_2O$ | 2.3% |
| $TiO_2$ | 1.9% |
| $SO_3$ | .04% |

The loss on ignition at a temperature of 1,000° C. is 3.1% by weight. The ash has a softening temperature of 2,460° F. and a melting temperature of 2,570° F. When it is necessary to increase the content of the ash to 25% or more, the high acidity of this component can be balanced by using basic oxygen furnace (BOF) slag, dolomite, or lime dust which have a relatively high content of carbonates. The maximum size of the aggregate in preparing the compressed pieces used in this invention is less than ¼". The fine aggregate is usually much cheaper than aggregate having larger size, such as 2-3" pieces.

The aggregate must have a high compressive strength (about 4,000-6,000 psi), a suitable chemical composition, a minimum loss on ignition, and a minimum sulfur content. BOF slag resulting from steel making is cheap and is available from steel mills as a waste material. It is available in particle size of less than ¼" recovered from free iron by magnetic separation. A typical chemical composition of BOF slag after sizing and magnetic separation is as follows:

| | |
|---|---|
| $SiO_2$ | 9.8% |
| $Al_2O_3$ | .6% |
| CaO | 44.7% |
| MgO | 8.3% |
| $Fe_2O_3$ | 25.0% |
| MnO | 6.5% |
| $TiO_2$ | .1% |
| $P_2O_5$ | .4% |

The amount of CaO and MgO, lack of sulfur, very low loss on ignition, and a relatively high content of ferric oxide (for dark colored products), manganese oxide, titanium oxide, and phosphorous penta oxide is favorable because it decreases the viscosity and thus increases the fluidity of the melt.

In preparing the agglomerate, the mineral wool waste, cement kiln dust, bottom ash, and aggregate, when used, are weighed out and delivered to a mixer. Water is added in the amount of 8-12%. It is important to use a minimum amount of water. The mix should have zero slump, or even a negative slump which reduces the amount of binder required and provides, immediately after molding, green strength sufficient to permit transfer of the pieces, without breaking, to a curing chamber, or to a stock pile. The mixture having zero slump, or negative slump, has a density equal to 75-100 lb./cu.ft. The material is compacted so that the agglomerated charge has a density of 130-140 lb./cu.ft. The stiff mix may be molded successfully by vibro pressing, or by briquetting equipment. Freeballing methods like pelletizing or similar methods known for ceramic compositions cannot be used in this invention.

To provide maximum consolidation at minimum molding time, say 30-45 seconds, the negative slump mixture should be subjected to intensive vibration (no less than 4,500 rpm). Simultaneously, pressure is applied by a head tamper at 10 psi to produce molded pieces of about 2" mean diameter. These pieces have a green strength which allows transfer of the material to a curing chamber without structural damage.

The pieces of agglomerate may be cured for about 8-10 hours. The curing can be carried out using waste heat from the cupola cooling system. The temperature should be raised over a period of 1½-2 hours to 180°-190° F. The curing is completed at this temperature within about four hours at a relative humidity of no less than 85%, and the pieces are then cooled for 1½-2 hours to ambient temperature. After curing, the pieces have a stength of about 2,000 psi. The ultimate moisture content is about 3-5%.

Rather than curing at elevated temperature, the pieces may be cured at ambient temperature (70°-75° F.) and relative humidity of no less than 85%. Under these conditions, the compressive strength after aging is as follows:

| Days Aged | Compressive Strength PSI |
|---|---|
| 3 | 800-1000 |
| 7 | 1600-1800 |
| 14 | 2000-2400 |
| 28 | 2800-3000 |

Alternatively, the negative slump mixture may be formed into briquettes on a standard briquetting machine having cooperating steel rolls with depressions of the desired size and shape. If the briquetting machine is fed by gravity, the density of the resulting briquettes is about 125-130 lbs./cu.ft. However, if the mixture is fed to the compacting rolls by means of a screw, and separate force is about 5 tons, the resulting briquettes will have a density of 150-160 lb./cu.ft. and exhibit a much better green strength, resistance to impact, and can be stockpiled immediately after molding.

The binder systems developed for this invention depend upon the type of molding. The binder for molding by vibro pressing methods, etc., utilizes much less of the expensive Portland cement than the prior art, which usually specifies the amount of at least 10%. Because of the presence of the cement kiln dust in the agglomerate of the invention, which has natural binding properties, the amount of Portland cement can be reduced to 5-6%. The amount of Portland cement in the binder can be reduced still further by grinding the shot to a particle size of less than 150 microns, preferably less than 50 microns. Shot is easily and inexpensively ground, and in a size of 50 microns or less only 3-4% of Portland cement is required in the binder. Experiments have shown that replacing a portion of the Portland cement with the ground shot reduces the cost of the binder by about 35-40% per ton of agglomerate.

For compaction by briquetting equipment, best results were obtained using a binder comprising 3% hydrated lime and 5-6% molasses or black liquor. This binder is, of course, more expensive than the binder mentioned above. A preferred composition of binder is as follows:

| | |
|---|---|
| Hydrated Lime | 3% |
| Black Liquor | 5-6% |
| Ground Shot (less than 50 microns) | 5% |

Agglomerated charge employing this binder has sufficient green strength so that they can be stockpiled immediately after molding.

Briquettes stored for three days at ambient temperature at relative humidity no less than 85% showed satisfactory results when introduced into a cupola. Although this three component binder is more expensive than the binder for vibro pressing, it may be more practical in some instances. Because the binder consisting of hydrated lime and molasses or black liquor creates an exothermic effect during compaction, the green briquettes should be conveyed in a single layer to prevent cracking.

In melting the raw materials in the cupola conveniently, it is necessary to use expensive metalurgical coke (3-4" in size) in the cupola in an amount of 14-16% by weight of the charge. Fine coke, much less expensive, cannot be used in the cupola. However, in accordance with this invention, we have incorporated fine coke having a size less than ½" into the agglomerate in an amount of 10-15%. Since coke is light in weight and since the ultimate density of the agglomerate should be between 140-150 lb./cu.ft., the amount of fine coke incorporated in the agglomerate cannot be higher than 10-15% by weight. By incorporating particles of coke uniformly in the agglomerate, the combustion was improved because of higher efficiency of heat transfer. The presence of the fine coke in the agglomerate allows decreasing consumption of this expensive coke, 3-4" in size, and also helps improve the melting process and minimizes the reduction of $CO_2$ to $CO$, which process absorbs heat and creates additional pollution.

SPECIFIC EXAMPLES

The following compositions will illustrate the various ingredients and their proportions useful in preparing agglomerate in accordance with the invention:

EXAMPLES OF AGGLOMERATED CHARGE COMPOSITION

| | PERCENT BY WEIGHT | | | | |
|---|---|---|---|---|---|
| | I | II | III | IV | V |
| Mineral wool production waste (≦¾") | 35 | 30 | 25 | 30 | 30 |
| Cement kiln dust | 25 | 25 | 18 | 20 | 15 |
| Bottom Ash | 10 | 17 | 20 | 20 | 30 |
| (Class) | F | F | F | C | C |
| Blast furnace slag (≦¾") | 24 | — | — | — | — |
| Binder: | | | | | |
| Portland cement type 1 | 6 | 4 | 3 | 3 | 3 |
| Ground shot | | 6 | 10 | 5 | 5 |
| (Particle size in microns) | | (<50) | (<150) | (<50) | (<50) |
| Lime dust | — | 18 | — | — | — |
| BOF slag (≦¼") | — | — | 14 | 7 | 17 |
| Dolomite (≦¾") | — | — | 10 | 15 | — |

The agglomerated charge of the different examples was melted in a pilot scale cupola in order to study meltability of the agglomerate. For each experiment, 1,000 lbs. of the agglomerate was prefabricated by vibropressing to a density of 130 lb./cu.ft., and a compressive strength of 2,000 psi. The agglomerate also was prefabricated either by vibro pressing or by compacting in a briquetting machine in the amount of 150 tons, and the product was successfully melted in the commercial cupola. Mineral wool was produced from the homogenized melt using standard fiberizing techniques and equipment. The mineral wool products manufactured during experimental evaluation exhibited significant improvement in quality compared to commercial products manufactured from blast furnace slag and additives. The diameter of the fibers was about 4.5 microns. Using the agglomerates of the invention, the amount of shot produced during fiberization was decreased to about 30–35%. The amount of shot in the mineral wool produced during experimental evaluation and in commercial products is as follows:

|  | Amount of Shot % | |
|---|---|---|
|  | Experimental | Commercial |
| Retain on No. 50 Sieve | 6.3 | 12.1 |
| Retain on No. 100 Sieve | 12.4 | 17.4 |
| TOTAL | 18.7 | 29.5 |

The significant decrease in the amount of shot provided improvement in the insulating properties of boards with density of 12–13 lb./cu.ft. 8–12% better at temperatures of 800°–1,200° F., and 15–20% better at temperatures of 1,400°–1,800° F. The insulating properties were measured on boards or bats having a density of 12–13 lb./cu.ft.

The melt from the charge of Example I and the mineral wool made from the melt had the following composition:

|  | Melt | Mineral Wool Fibers |
|---|---|---|
| $SiO_2$ | 36.5–37.1 | 37.1–37.8 |
| $Al_2O_3$ | 8.7–9.2 | 8.7–9.2 |
| CaO | 34.9–35.9 | 34.4–36.1 |
| MgO | 4.9–5.2 | 5.6–5.7 |
| $Fe_2O_3$ | 3.8–4.2 | 3.6–4.4 |
| $K_2O$ | 0.9–1.0 | 0.8–0.9 |
| $Na_2O$ | 0.5 | 0.5 |
| MnO | 0.2 | 0.2 |

The invention is also useful in producing light-colored mineral wool fibers by eliminating from the agglomerate composition the ingredients containing ferric oxide, e.g. bottom ash. The following examples illustrate compositions for briquetting which produce fibers that can be used in manufacture of acoustical tile and similar products.

EXAMPLES OF AGGLOMERATED CHARGE COMPOSITION

|  | PERCENT BY WEIGHT | | | | | |
|---|---|---|---|---|---|---|
|  | VI | VII | VIII | IX | X | XI |
| Mineral wool production waste (≦¾") | 20 | 25 | 30 | 40 | 50 | 50 |
| Cement Kiln Dust | 20 | 25 | 25 | 25 | 15 | 20 |
| Clay | — | 18 | 20 | — | 20 | 17 |
| Southern Bentonite | 10 | — | — | — | — | — |
| Western Bentonite Volclay | — | — | — | 12 | — | — |
| Blast Furnace Slag (≦¾") | 37 | 17 | 10 | — | — | — |
| Dolomite (≦¾") | — | — | 10 | 10 | 10 | — |
| Binder: | | | | | | |
| Portland Cement Type 1" | 3 | 3 | 5 | 3 | 5 | 3 |
| Ground Wool Production waste (particle size in microns) | 5 (<50) | 10 (<150) | — | 10 (<150) | — | 10 (<150) |

CHEMICAL COMPOSITION OF SPECIFIC EXAMPLES

| Chemical | Examples | | | | | |
|---|---|---|---|---|---|---|
|  | VI | VII | VIII | IX | X | XI |
| $SiO_2$ | 38.4 | 36.4 | 37.5 | 37.8 | 38.9 | 39.2 |
| $Al_2O_3$ | 10.6 | 12.9 | 12.5 | 12.7 | 13.1 | 13.8 |
| CaO | 40.5 | 39.2 | 37.9 | 38.8 | 39.3 | 38.8 |
| MgO | 3.2 | 4.8 | 5.1 | 5.4 | 5.7 | 4.1 |
| $Fe_2O_3$ | 0.6 | 0.7 | 0.9 | 0.65 | 0.7 | 0.8 |
| $SO_3$ | 0.45 | 0.6 | 0.55 | 0.7 | 0.4 | 0.5 |
| $Na_2O$ | 0.3 | 0.2 | 0.4 | 0.2 | 0.2 | 0.4 |
| $K_2O$ | 0.4 | 0.5 | 0.7 | 0.3 | 0.4 | 0.5 |
| $TiO_2$ | 0.15 | 0.1 | 0.2 | 0.1 | 0.15 | 0.2 |

The clays and blast furnace slag in Examples VI through XI have the following compositions in % by weight.

|  | Blast Furnace Slag | Clay | Southern Bentonite | Western Bentonite Volclay |
|---|---|---|---|---|
| $SiO_2$ | 36–39 | 79.5 | 64.3 | 56–59 |
| $Al_2O_3$ | 9–12 | 2.6 | 20.7 | 18–21 |
| CaO | 38–40 | 1.0 | 0.5 | 1.2–3.5 |
| MgO | 9–11 | 1.2 | 2.3 | 3.0–3.3 |
| $Fe_2O_3$ | 0.5–1.0 | 4.2 | 3.0 | 5–6 |
| $SO_3$ | <1.0 | 0.1 | 0.3 | 0.1–0.15 |
| $Na_2O$ | — | 0.15 | 2.6 | 0.4 |
| $K_2O$ | — | 1.1 | 0.4 | 0.7 |
| $TiO_2$ | — | 0.7 | 0.15 | 0.8 |

The agglomerates molded into briquettes in accordance with Examples VI through XI have a moisture content of 7–8%, a density of 135–150 lbs./cu.ft. and a compressive strength as follows:

| Immediately after briquetting- "green strength" | 150–250 psi |
|---|---|
| After 24 hours | 400–600 psi |
| After 3 days | 1000–1200 psi |
| After kilning at 1000° C. | 1200–1800 psi |

Mineral wool produced using standard fiberizing techniques and equipment exhibited physical properties equivalent to those of Examples I–V, except the wool was light colored.

Illustrative examples of a light colored composition for producing an agglomerate by vibro pressing are as follows:

|  | XII | XIII |
|---|---|---|
| Mineral Wool Production Waste (≦¾") | 25 | 45 |
| Cement Kiln Dust | 20 | 25 |
| Silica Sand | 6 | 10 |
| Blast Furnace Slag (≦¾") | 36 | 5 |
| Binder: | | |
| Portland Cement Type 1" | 3 | 5 |
| Ground Wool Production Waste (<150 microns) | 10 | 10 |

The vibro-pressed agglomerate has a moisture content of 10–12%. When vibro pressing equipment is used, green strength of the agglomerate is not so important because the molded bodies are transferred to the curing station on pallets. However, the vibro pressing procedure is more expensive than briquetting because of the capital cost of the equipment, labor and maintenance.

In accordance with the invention, the agglomerates for manufacture of light colored mineral wool are produced using the least expensive ingredients while producing excellent green strength and compressive strength which minimizes disintegration in the cupola while the temperature is being raised to the melting point.

What is claimed is:

1. A controlled method for making a chemically homogeneous melt for producing light-colored mineral wool which comprises:

(a) physically homogenizing a mixture of the following formula:

| Ingredient | % By Weight |
   | --- | --- |
   | Mineral Wool Production Waste (≦¾") | 20–50 |
   | Cement Kiln Dust | 15–25 |
   | Clay | 12–20 |
   | Blast Furnace Slag (≦¾") | 10–40 |
   | Dolomite (≦¾") | 0–10 |
   | Portland Cement | 3–5 |
   | Ground Portion of said wool production waste (<150 microns) | 5–10 |

(b) briquetting said mixture into agglomerate pieces of predetermined size and shape to a density of 125 to 160 lbs./ft³;
   (c) melting said agglomerate in a cupola furnace;
   (d) discharging the molten agglomerate into a receiver;
   (e) passing hot combustion gases into said melt to chemically homogenize the melt and heat the melt to a predetermined temperature; and
   (f) converting said melt into fibers.

2. A controlled method for making a chemically homogeneous melt for producing a light-colored mineral wool which comprises (a) physically homogenizing a mixture of the following formula:

| Ingredient | % By Weight |
   | --- | --- |
   | Cement kiln dust | 20–25 |
   | Mineral wool production waste | 25–45 |
   | Silica sand | 5–10 |
   | Blast furnace slag (≦¾") | 10–40 |
   | Binder: | |
   | Portland Cement | 3–5 |
   | Ground portion of said wool production waste (<150 microns) | 5–10 |

(b) compacting said mixture into agglomerate pieces of predetermined size and shape to a density of 125 to 160 lbs./ft³;
   (c) melting said agglomerate in a cupola furnace;
   (d) discharging the molten agglomerate into a receiver;
   (e) passing hot combustion gases into said melt to chemically homogenize the melt and heat the melt to a predetermined temperature; and
   (f) converting said melt into fibers.

3. The method of claim 2 which includes 5% by weight of igneous rock based upon the total weight of the compacted agglomerate.

4. The method of claim 1 which includes incorporating into said mixture fine coke or coal having a particle size 7½" or less in the amount of 10–15% based upon the total weight of the ingredients in the mixture.

5. The method of claim 2 which includes incorporating into said mixture fine coke or coal having a particle size 7½" or less in the amount of 10–15% based upon the total weight of the ingredients in the mixture.

6. The method of claim 2 in which said compacting step is carried out by vibro pressing.

* * * * *